(12) United States Patent
Takata et al.

(10) Patent No.: US 8,804,170 B2
(45) Date of Patent: Aug. 12, 2014

(54) PRINTING SYSTEM, PRINT DATA GENERATING DEVICE, MULTI-FUNCTION DEVICE, AND NON-TRANSITORY RECORDING MEDIUM

(75) Inventors: Masayuki Takata, Nagoya (JP); Tomoyuki Kubo, Nagoya (JP); Yoshinori Yokoe, Inuyama (JP); Hiroto Sugahara, Ama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 682 days.

(21) Appl. No.: 13/032,769

(22) Filed: Feb. 23, 2011

(65) Prior Publication Data

US 2011/0211214 A1     Sep. 1, 2011

(30) Foreign Application Priority Data

Feb. 26, 2010    (JP) .................................. 2010-042798

(51) Int. Cl.
     *H04N 1/00*          (2006.01)

(52) U.S. Cl.
     USPC .......................... 358/1.15; 358/1.16; 358/403

(58) Field of Classification Search
     CPC .................... G06F 17/30247; G06F 17/30256; H04N 1/00326; H04N 1/00328; H04N 1/00334; H04N 2201/3269
     USPC ................................ 358/1.15–1.18, 403, 474
     See application file for complete search history.

(56) References Cited

U.S. PATENT DOCUMENTS

| | | | |
|---|---|---|---|
| 6,023,342 A | 2/2000 | Yanagida | |
| 2005/0011958 A1 | 1/2005 | Fukasawa et al. | |
| 2009/0237712 A1 | 9/2009 | Shirai | |

FOREIGN PATENT DOCUMENTS

| | | |
|---|---|---|
| JP | 05-017767 | 3/1993 |
| JP | H07295958 A | 11/1995 |
| JP | 07-320073 | 12/1995 |
| JP | 2005-020727 | 1/2005 |
| JP | 2006-276906 A | 10/2006 |
| JP | 2007-128314 | 5/2007 |
| JP | 2007-336062 A | 12/2007 |
| JP | 2009-003884 A | 1/2009 |

OTHER PUBLICATIONS

Co-pending U.S. Appl. No. 13/032,748, filed Feb. 23, 2011.
JP Office Action mailed Feb. 26, 2013, JP Appln. 2010-042798, partial English translation.
Notice of Reasons for Rejection received in corresponding Japanese Application No. 2010-041354 mailed on Jun. 4, 2013.
Final Office Action issued in U.S. Appl. No. 13/032,748 mailed May 14, 2013.
Office Action received in corresponding U.S. Appl. No. 13/032,748 mailed Dec. 4, 2012.

*Primary Examiner* — Marivelisse Santiago Cordero
*Assistant Examiner* — Kent Yip
(74) *Attorney, Agent, or Firm* — Banner & Witcoff, Ltd.

(57) ABSTRACT

In a printing system, a print data generating unit generates first print data of an original image that includes a bar code storing a disposing position and a particular sub-image. The particular sub-image is disposed at the disposing position when the original image is read and processed. A first printing unit prints the original image on a first recording medium based on the first print data. A controller controls a reading unit to read the original image printed on the first recording medium and to retrieve the disposing position and the particular sub-image from the bar code. The controller generates second print data of a processed image in which the retrieved particular sub-image is disposed at the retrieved disposing position. The controller controls the second printing unit to print the processed image on a second recording medium based on the second print data.

16 Claims, 21 Drawing Sheets

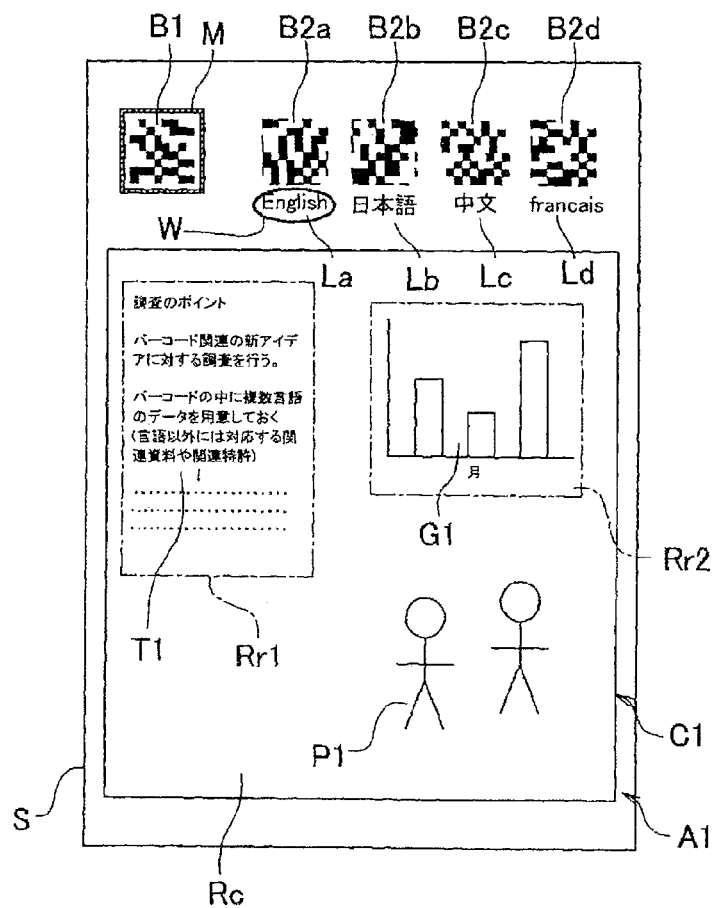

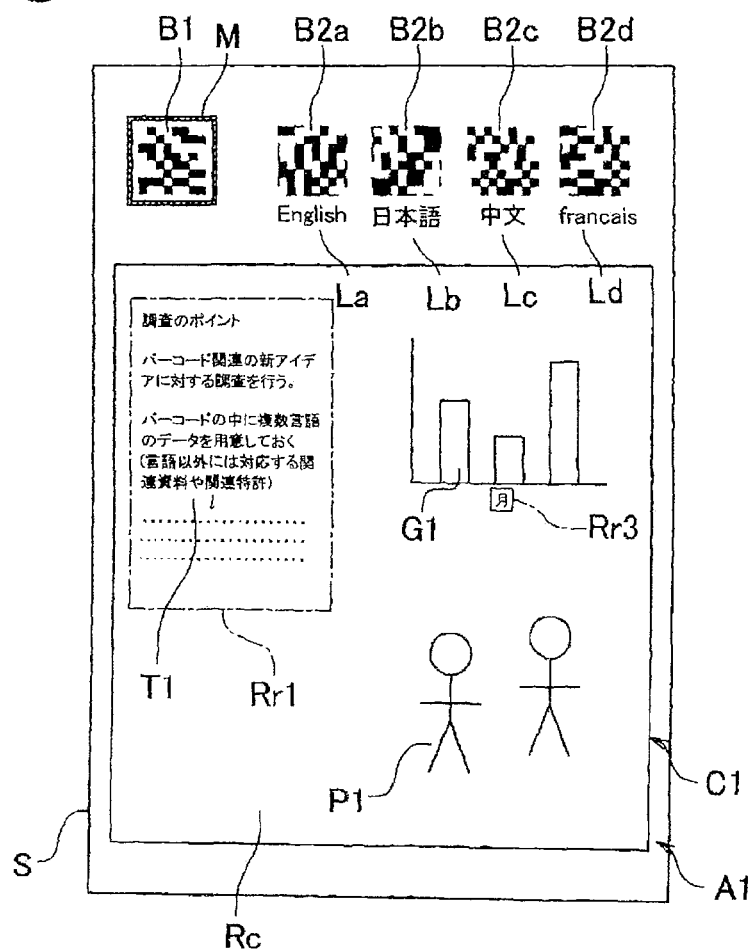

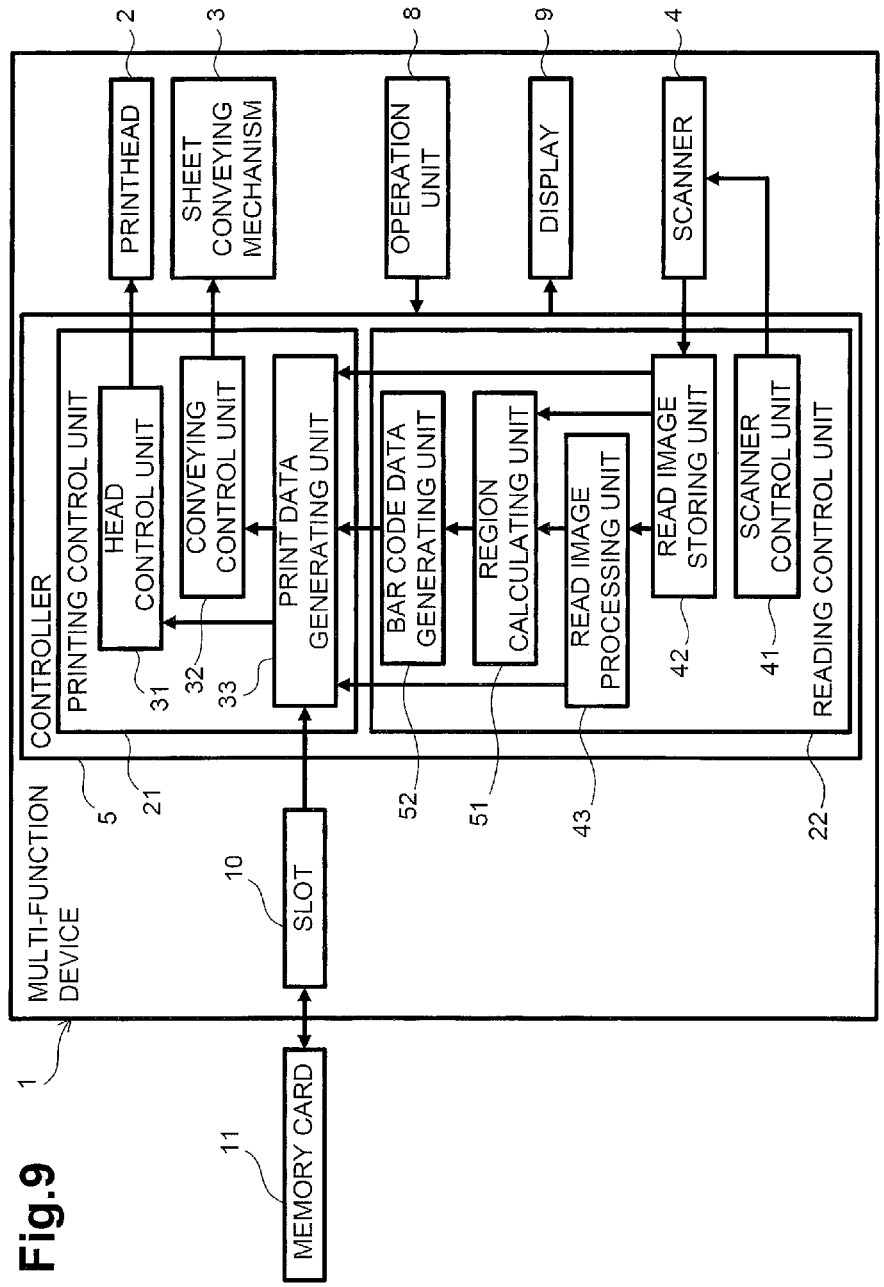

Fig.14A
Fig.14B
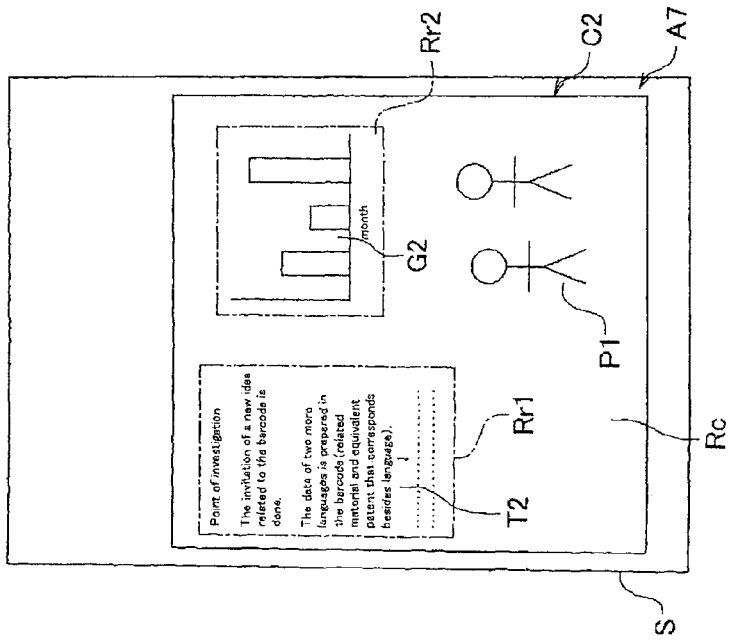
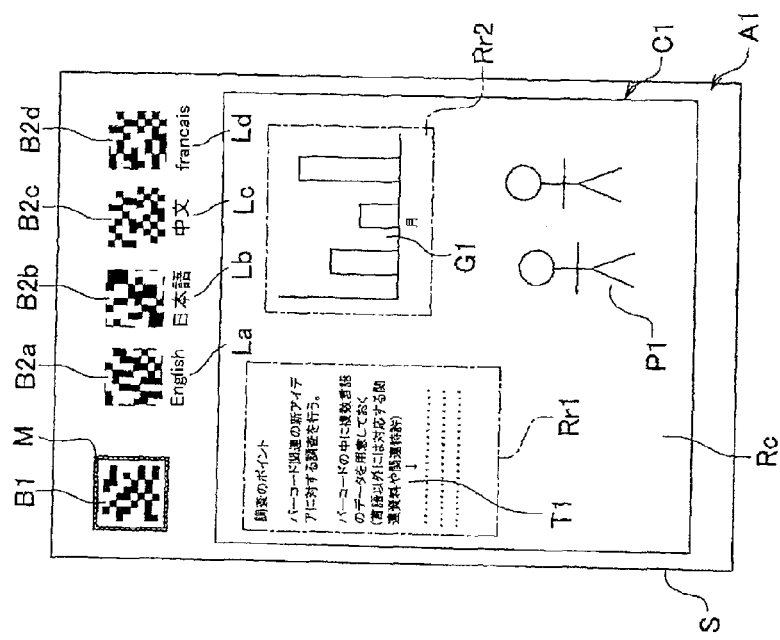

PRINTING SYSTEM, PRINT DATA GENERATING DEVICE, MULTI-FUNCTION DEVICE, AND NON-TRANSITORY RECORDING MEDIUM

BACKGROUND OF THE INVENTION

1. Field of the Invention

The present application claims priority from Japanese Patent Application Publication No. JP-2010-042798, which was filed on Feb. 26, 2010, the disclosure of which is incorporated herein by reference in its entirety.

The present invention relates to a printing system and a multi-function device that are configured to print and read an image, and a print data generating device and a non-transitory recording medium for generating print data of an image.

2. Description of Related Art

A known recording medium, e.g., a poster, includes a photograph of a product, e.g., a car, and a plurality of bar codes each storing a URL. By reading a bar code, e.g., by a mobile phone, a website describing the product in a language corresponding to the read bar code is displayed on the mobile phone.

SUMMARY OF THE INVENTION

A need has arisen for a print data generating device and a non-transitory recording medium for generating print data of an image which includes a bar code and is to be processed using data stored in the bar code, without the need for accessing to a website. A need also has arisen for a printing system and a multi-function device configured to read an image printed based on such print data and to process the image using the data stored in the bar code, without the need for accessing to a website.

According to an embodiment of the invention, a printing system comprises a print data generating unit, a first printing unit, a second printing unit, reading unit, and a controller. The print data generating unit is configured to generate first print data of an original image that includes a bar code that stores a disposing position and a particular sub-image. The particular sub-image is disposed at the disposing position when the original image is read and processed. The first printing unit is configured to print the original image on a first recording medium based on the first print data. The controller is configured to control the reading unit to read the original image printed on the first recording medium and to retrieve the disposing position and the particular sub-image from the bar code. The controller is configured to generate second print data of a processed image in which the retrieved particular sub-image is disposed at the retrieved disposing position, and to control the second printing unit to print the processed image on a second recording medium based on the second print data.

According to another embodiment of the invention, a print data generating device comprises a print data generating unit configured to generate print data of an original image that includes a bar code that stores a disposing position and a particular sub-image. The particular sub-image is disposed at the disposing position when the original image is read and processed.

According to another embodiment of the invention, a multi-function device comprises a printing unit, a reading unit, and a controller. The controller is configured to control the reading unit to read an original image printed on a first recording medium and including a bar code, and to retrieve a disposing position and a particular sub-image from the bar code. The controller is configured to generate print data of a processed image in which the retrieved particular sub-image is disposed at the retrieved disposing position, and to control the printing unit to print the processed image on a second recording medium based on the print data.

According to another embodiment of the invention, a non-transitory recording medium stores a computer readable program that, if executed by a processor of a computer, causes the processor to execute generating print data of an original image that includes a bar code that stores a disposing position and a particular sub-image. The particular sub-image is disposed at the disposing position when the original image is read and processed.

Other objects, features, and advantages will be apparent to persons of ordinary skill in the art from the following detailed description of the invention and the accompanying drawings.

BRIEF DESCRIPTION OF THE DRAWINGS

For a more complete understanding of the invention, the needs satisfied thereby, and the features and technical advantages thereof, reference now is made to the following descriptions taken in connection with the accompanying drawings.

FIG. 6 shows an image in which a writing is added before the image is read by a scanner of the multi-function device.

FIG. 7 shows an image printed by the multi-function device, according to a first modification.

FIG. 9 shows a diagram showing control executed by the control unit of the multi-function device, according to the second modification.

FIG. 14A shows an image printed by the multi-function device, according to a fifth modification.

FIG. 14B shows an image printed by the multi-function device based on the image of FIG. 14A, according to the fifth modification.

DETAILED DESCRIPTION OF EMBODIMENTS

Embodiments of the invention and their features and technical advantages may be understood by referring to FIGS. 1-19, like numerals being used for like corresponding parts in the various drawings.

Figure 1A:
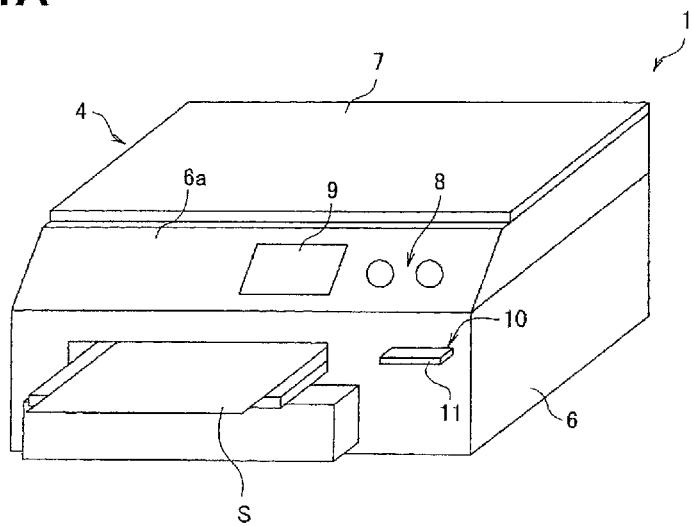
FIG. 1A shows a schematic view showing a multi-function device according to an embodiment of the invention.
Figure 1B:
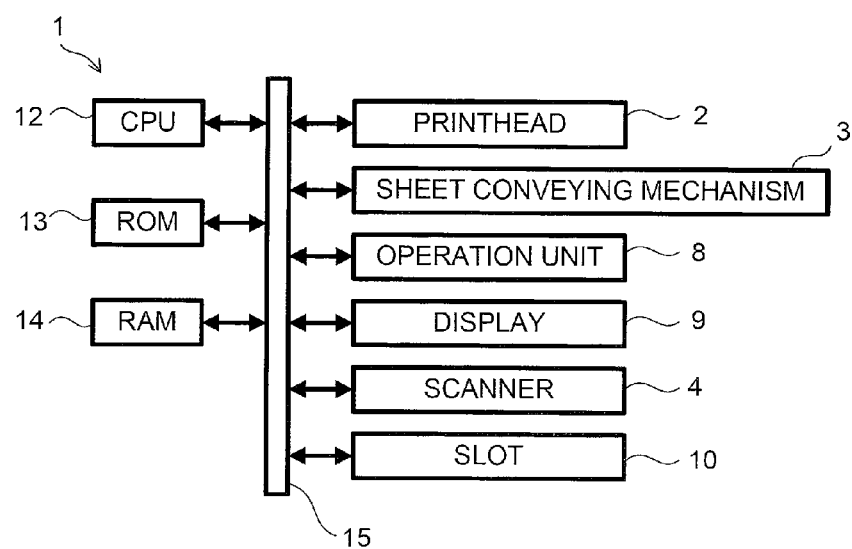
FIG. 1B is a block diagram showing an electrical structure of the multi-function device of FIG. 1A.
Figure 2:
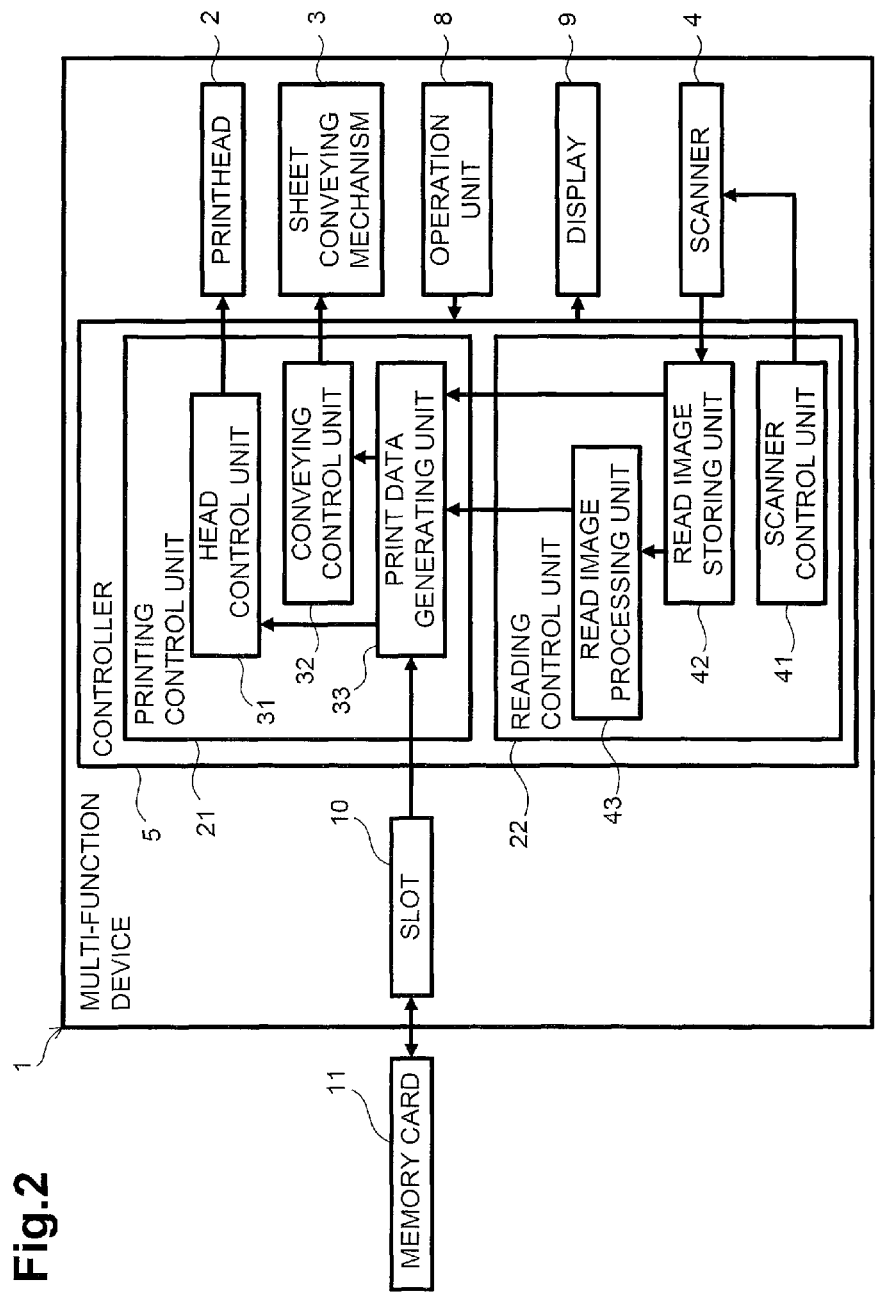
FIG. 2 is a diagram showing control executed by a controller of the multi-function device.

As shown in FIGS. 1 and 2, a multi-function device 1 according to an embodiment of the invention includes a printhead 2 that prints an image on a recording medium, such as a sheet S, a sheet conveying mechanism 3 that conveys the sheet S in a predetermined direction (forward in FIG. 1A), a scanner 4 that reads an image printed on the sheet S, and a controller 5 that controls the various mechanisms of the multi-function device 1, such as the printhead 2, the sheet conveying mechanism 3, and the scanner 4.

As shown in FIG. 1A, the multi-function device 1 has a substantially rectangular parallelepiped main body 6, in which the printhead 2, the sheet conveying mechanism 3, and so on are accommodated. The printhead 2 prints on the sheet S by a known method, such as an inkjet method, a laser method, or a thermal transfer method. The sheet conveying mechanism 3 is configured to convey the sheet S in a predetermined direction with a conveying roller that is rotationally driven by a motor.

The scanner 4 is provided at the top of the main body 6. As shown in FIG. 1A, the scanner 4 includes a glass original plate (not shown), a reading unit (not shown) disposed below the original plate, and a cover 7 that covers the upper surface of the original plate. The scanner 4 is configured to read an image printed on an original with the reading unit after the original is placed on the upper surface of the original plate, with the cover 7 closed.

An inclined surface 6a is formed at the upper part of the front of the main body 6. The inclined surface 6a is provided with an operation unit 8 having a plurality of operation buttons to be operated by a user and a display 9 that displays the operating state of the multi-function device 1, an error message, a content read from a bar code, to be described later, etc. The right of the front of the main body 6 is provided with a slot 10 in which a memory card 11 is to be inserted. Data, such as image data, recorded on the memory card 11 is retrieved in the slot 10 and is input to the controller 5.

For ease of explanation, image data is input from the memory card 11 to the multi-function device 1 via the slot 10; the input of image data to the multi-function device 1 is not limited thereto. For example, image data may be input to the multi-function device 1 through a cable that connects the multi-function device 1 and a digital camera. Alternatively, image data may be input from a mobile phone having a camera function to the multi-function device 1 via a radio communication using infrared rays or the like.

As shown in FIG. 1B, the multi-function device 1 comprises a central processing unit (CPU) 12, a read only memory (ROM) 13, a random access memory (RAM) 14, the printhead 2, the sheet conveying mechanism 3, the operation unit 8, the display 9, and the slot 10. These elements are electrically connected with one another via a bus 15. The CPU 12 collectively controls the multi-function device 1 and operates in accordance with programs and data stored in the ROM 13. The RAM 14 temporarily stores data processed by the CPU 12. The CPU 12, ROM 13, and RAM 14 function as the controller 5.

As shown in FIG. 2, the controller 5 comprises a printing control unit 21 and a reading control unit 22. The reading control unit 22 performs control when the scanner 4 reads an image and bar codes. The reading control unit 22 comprises a scanner control unit 41, a read image storing unit 42, and a read image processing unit 43.

The scanner control unit 41 controls the operation of the scanner 4 when it reads an image. The read image storing unit 42 temporarily stores an image read by the scanner 4. The read image processing unit 43 processes the image stored in the read image storing unit 42 to retrieve data stored in a bar code, to be described later.

The printing control unit 21 performs control when the multi-function device 1 performs printing. The printing control unit 21 comprises a head control unit 31, a conveying control unit 32, and a print data generating unit 33. The head control unit 31 and the conveying control unit 32 control the printhead 2 and the sheet conveying mechanism 3, respectively, when the multi-function device 1 performs printing. The print data generating unit 33 generates print data of an image based on, for example, image data recorded on the memory card 11 inserted in the slot 10, an image stored in the read image storing unit 42, and data retrieved from the bar code, to be described later, by the read image processing unit 43.

When a print instruction from the operation unit 8 is input by the user, an image is printed based on the image data input from the memory card 11, and the printed image is processed, as will be described later.

The controller 5 displays the state (print state or standby state) of the multi-function device 1, an error message, etc. on the display 9 to notify the user of such information.

Next, an original image printed by the multi-function device 1 and an image processed from the original image and printed by the multi-function device 1 will be described. The multi-function device 1 prints, for example, an original image A1 as shown in FIG. 3A based on data recorded on the memory card 11 inserted in the slot 10.

Figure 3A:
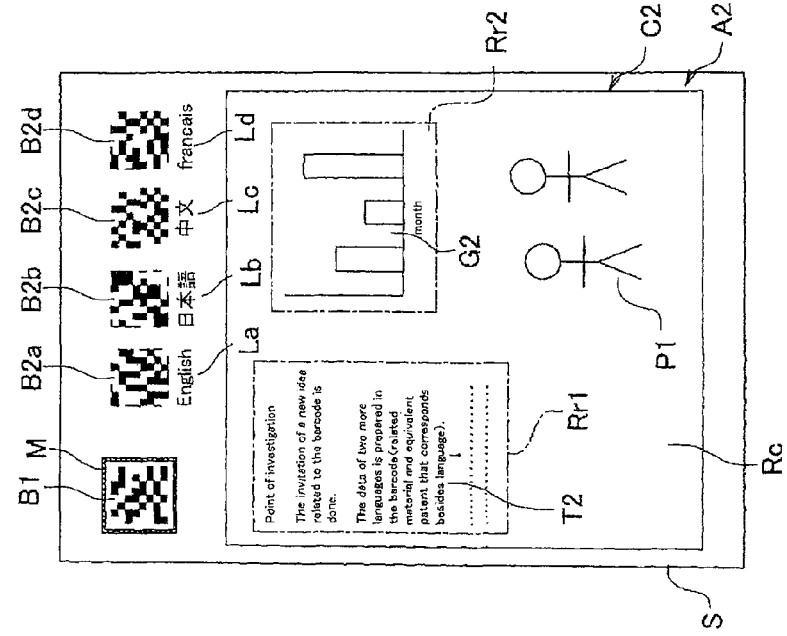
FIG. 3A shows an image printed by the multi-function device.

As shown in FIG. 3A, the image (original image) A1 includes a main image C1, a first bar code B1, and four second bar codes B2a to B2d. The first bar code B1 and the second bar codes B2a to B2e are configured to store various data, e.g. text, images, and positions of text and images. The main image C1 includes Japanese text T1 (a character string), a graph G1 having Japanese text (a character string), and a picture P1 having no text.

The first bar code B1 is disposed at the upper left end of the sheet S. The first bar code B1 stores disposing positions, e.g., positions of replacement regions Rr1 and Rr2. Here, in the main image C1, the text T1 is disposed in the replacement region Rr1, and the graph G1 is disposed in the replacement region Rr2. That is, in this embodiment, the main image C1 includes Japanese character strings in the replacement regions Rr1 and Rr2. The text T1 and the graph G1 are to be replaced with different images, respectively, as will be described later.

The region of the main image C1 other than the replacement regions Rr1 and Rr2, e.g., a region in which the picture P1 is disposed, is a copy region Rc that is to be copied. The image A1 further includes an identifying mark M (identifying image) which encloses the first bar code B1 and by which the first bar code B1 is identified.

The second bar codes B2a to B2d are disposed in the lateral direction at the right of the first bar code B1. The second bar codes B2a to B2d each store text T2 (sub-image) and a graph G2 (sub-image) which are translated from the text T1 and the Graph G1 into English, Japanese, Chinese, and French, respectively. The text T1 and the graph G1 are to be replaced by text T2 and a graph G2, as will be described later. Here, the Japanese text T2 and graph G2 stored in the second bar code B2b are the same as the text T1 and graph G1. Further, language names La to Ld (content display images) for identifying contents stored in the second bar codes B2a to B2d are disposed below the second bar codes B2a to B2d, respectively. This allows the user to know what is stored in the second bar codes B2a to B2d by referring to the language names La to Ld, respectively. The first bar code B1 further stores print positions of the second bar codes B2a to B2d and print positions of the language names La to Ld.

Figure 3B:
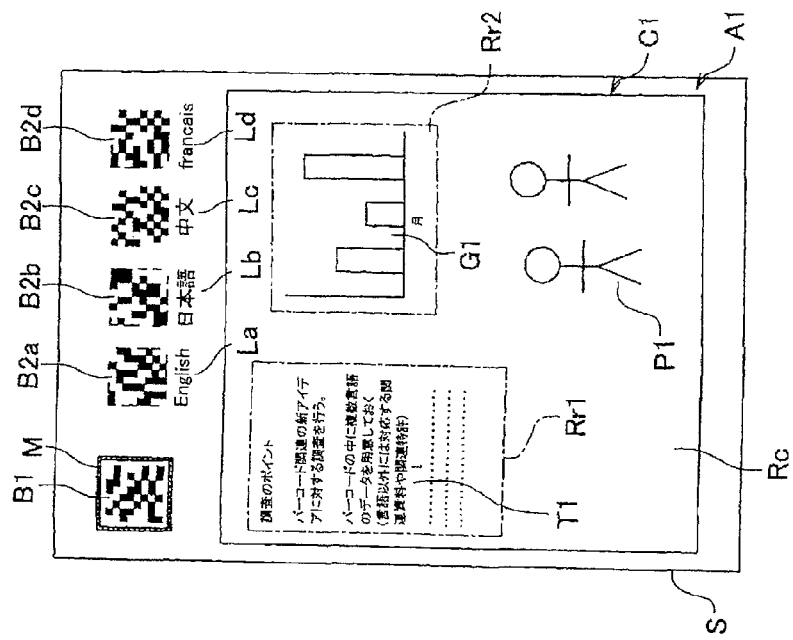
FIG. 3B shows an image printed by the multi-function device based on the image of FIG. 3A.

FIG. 3B is an example of an image (processed image) A2 that is obtained when the multi-function device 1 reads and processes the original image A1 in FIG. 3A. As shown in FIG. 3B, the processed image A2 includes a main image C2. In the main image C2, the Japanese text T1 and graph G1, which are sub-images included in the main image C1, are replaced with the text T2 and graph G2 in another language (English in FIG. 3B), and the other copy region Rc including the picture P1 is copied without change. Further, the first bar code B1 and the second bar codes B2a to B2b are copied without change. That is, the multi-function device 1 is configured to process an original image printed in Japanese and to print an image in another language.

Figure 4:
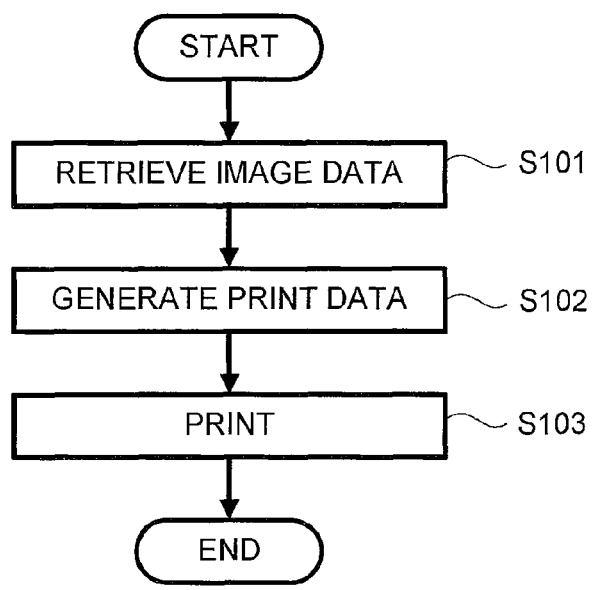
FIG. 4 is a flowchart showing a procedure for printing the image of FIG. 3A.

Next, a procedure for printing the image A1 shown in FIG. 3A will be described. FIG. 4 is a flowchart showing the procedure.

In order to print the image A1, image data of the image A1 shown in FIG. 3A is prepared and recorded in the memory card 11 in advance. More specifically, image data of the image A1 is generated using image editing software or the like and is recorded in the memory card 11. In the image A1, the main image C1 including the text T1, graph G1, and picture P1, as well as the first bar code B1, the second bar codes B2a to B2d, the identifying mark M, and the language names La to Ld are disposed, as shown in FIG. 3A, As shown in FIG. 4, the image data of the image A1 is retrieved from the memory card 11 inserted in the slot 10 (step S101, hereinafter simply referred to as S101). Next, the print data generating unit 33 generates print data based on the image data retrieved from the memory card 11 (S102), and an image is printed based on the generated print data (S103). Consequently, the image A1, as shown in FIG. 3A, is printed.

Figure 5:
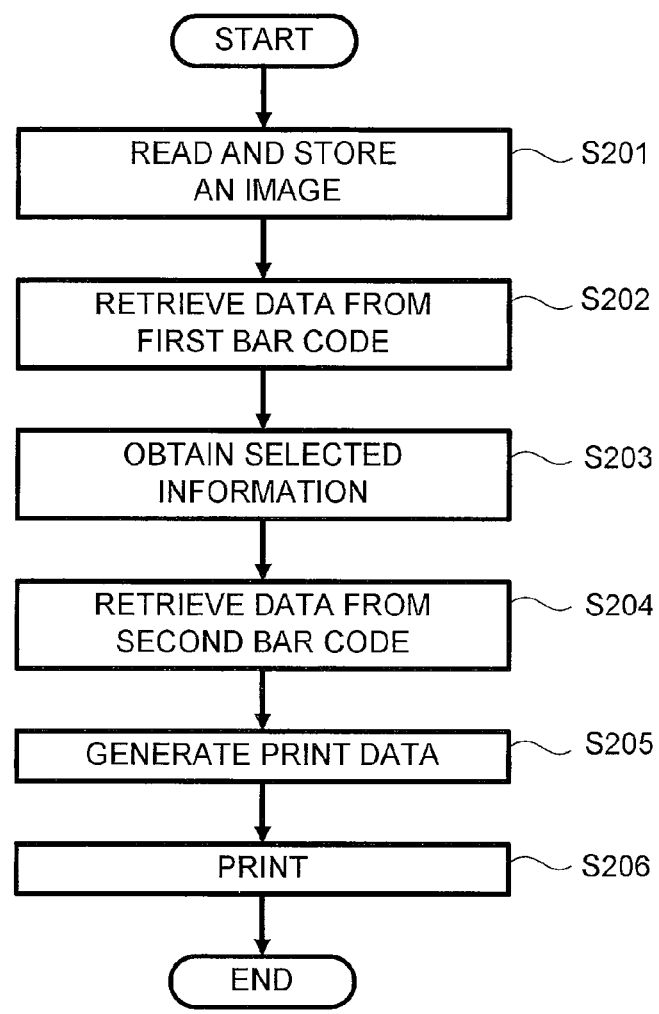
FIG. 5 is a flowchart showing a procedure for printing the image of FIG. 3B.

Next, a procedure for reading the image A1 and printing the image A2, which is partially different from the image A1, will be described, with reference to the FIG. 5. Here, in this embodiment, as shown in FIG. 6, a writing W is added with a pen or the like to the image A1 in such a manner as to circle one of the printed language names La to Ld (language name La (English) in FIG. 6) before the image A1 is read by the scanner 4.

The image A1 with the writing W added is read by the scanner 4, and the read image A1 is stored in the read image storing unit 42 (S201).

Next, the read image processing unit 43 retrieves the data from the first bar code B1 stored in the read image storing unit 42 (S202). Here, although a total of five bar codes, that is, the first bar code B1 and the second bar codes B2a to B2d, are included in the read image A1, the read image processing unit 43 is allowed to distinguish the first bar code B1 from the second bar codes B2a to B2d based on the position of the identifying mark M that is disposed so as to enclose the first bar code B1 in the image A1. This therefore prevents the read image processing unit 43 from retrieving data recorded in the second bar codes B2a to B2d by mistake. Further, since the first bar code B1 is identified based on the position of the identifying mark M, the flexibility in disposing the first bar code B1 in the image A1 can be enhanced.

Next, the read image processing unit 43 obtains selected information as to which second bar code (which language) is selected based on the position of the writing W and on the position of language name (language name La in this embodiment) retrieved from the first bar code B1 in S202 described above (S203). The read image processing unit 43 then retrieves replacement images (text T2 and graph G2) from the selected one (second bar code B2a) of the four second bar codes B2a to B2d, based on the obtained selected information and on the position of the second bar codes B2a to B2d retrieved from the first bar code B1 (S204).

Here, in this embodiment, the positions of the second bar codes B2a to B2d are stored in first bar code B1. Therefore, the positions of the second bar codes B2a to B2d in the image A1 may be changed so long as the positions of the second bar codes B2a to B2d stored in the first bar code B1 in the image A1 are changed.

Next, based on the read image A1 stored in the read image storing unit 42, the positions (disposing positions) of the replacement regions Rr1 and Rr2 retrieved from the first bar code B1, and the replacement images (sub-images) retrieved from the selected second bar code B2a, the print data generating unit 33 generates print data of the image A2 (S205) in which the retrieved replacement images (sub-images) are disposed at the positions (disposing positions) of the replacement regions Rr1 and Rr2. The print data of the image A2 is generated by replacing corresponding sub-images of the read image A1 with the retrieved replacement images (sub-images), such that the image A2 includes a main image C2, in which the text T2, the graph G2, and the copy region R car disposed, the first bar code B1, and the second bar codes B2a to B2d. The text T2 in the replacement region Rr1 and the graph G2 in the replacement region Rr2 are disposed in the main image C2 in place of the text T1 and the graph G1 of the main image C1. The copy region Re includes the picture P1 copied from the main image C1 without change. The first bar code B1 and the second bar codes B2a to B2d are copied from the image A1 without change. The image A2 is printed based on the generated print data (S206). Consequently, the main image C1 is processed into the main image C2 while part of the main image C1 is replaced. That is, the Japanese main image C1 is processed into and printed as the English main image C2.

Since the image A1 includes the four second bar codes B2a to B2d, the Japanese main image C1 may be processed into the main image C2 translated into Chinese or French when the scanner 4 reads the image A1 after the writing W is added to the image A1 so as to circle the language name Lc (Chinese) or Ld (French). In the case where the writing W is added to the image A1 so as to circle the language name Lb (Japanese) and then the image A1 is read by the scanner 4, the whole image A1 is copied without change because the printed text T1 and graph G1 are the same as the text T2 and graph G2 stored in the second bar code B2b.

In this embodiment, the positions of the replacement regions Rr1 and Rr2 are stored in the first bar code B1, and the text T2 replacing the text T1 in the replacement region Rr1 and the graph G2 replacing the graph G1 in the replacement region Rr2 are stored in the second bar codes B2a to B2d. When the original image A1 is processed into the image A2, the text T2 and the graph G2 are retrieved from the selected one of the bar codes B2a to B2d and are printed, and the other part (copy region Rc), including the picture P1, is read from the image C1 and is copied without change. Thus, the second bar codes B2a to B2d are not required to store common part between the original main image C1 and the processed main image C2, and the amount of data to be stored there is reduced.

Further, the first bar code B1 storing the positions of the replacement regions Rr1 and Rr2 is provided separately from the second bar codes B2a to B2d each storing the replacement images that replace the images in the replacement regions Rr1 and Rr2 in the original main image C1. Accordingly, each of the second bar codes B21 to B2d can store a larger amount of data of replacement images, as compared with a case in which each of the second bar codes B21 to B2d stores both the positions of the replacement regions Rr1 and Rr2 and the replacement images.

Further, since the image A2 includes the first bar code B1 and the second bar codes B2a to B2d as well as the main image C2, the image A2 may be further processed into another image that includes a main image translated from the main image C2 into another language when the scanner 4 reads the image A2.

Next, modifications in which various changes are made to the above-described embodiment will be described. Descriptions of components having the same configurations as those of the above-described embodiment are omitted as appropriate.

In a modification (a first modification), as shown in FIG. 7, only a text part of the graph G1 is a replacement region Rr3, and the second bar codes B2a to B2d store text in English, Japanese, Chinese, and French, respectively, for replacing the text part of the graph G1.

In this case, since only the text for replacing the text part of the graph G1 should be stored in the second bar codes B2a to B2d, the amount of data to be stored in the second bar codes B2a to B2d can be reduced further.

Figure 8A:
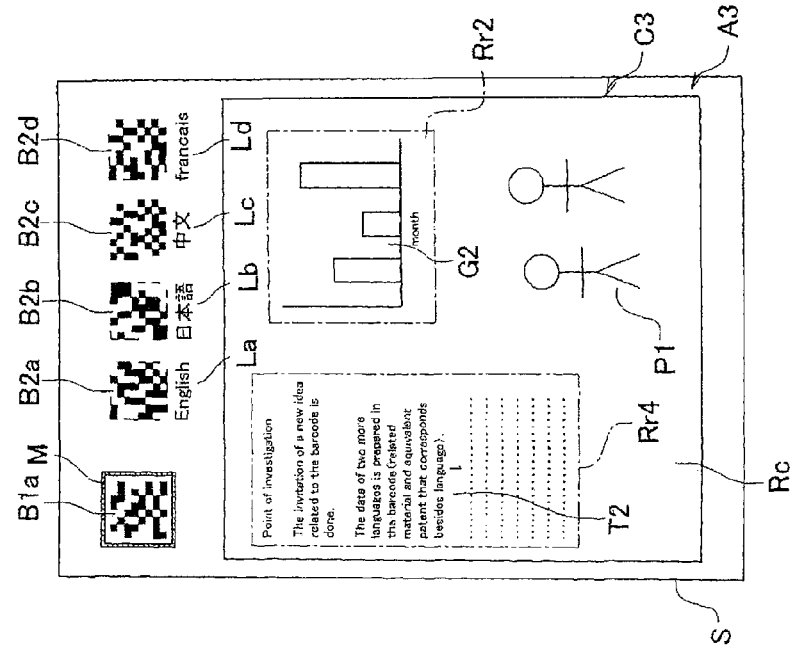
FIG. 8A shows an image printed by the multi-function device, according to a second modification.
Figure 8B:
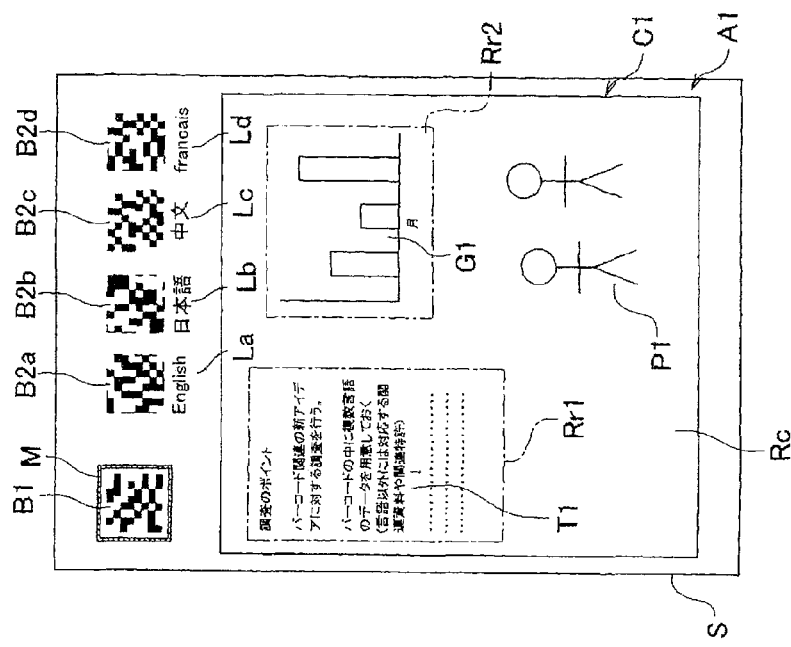
FIG. 8B shows an image printed by the multi-function device based on the image of FIG. 7A, according to the second modification.

In another modification (a second modification), as shown in FIGS. 8A and 8B, the replacement region Rr1, including the text T1, in the main image C1 differs in size from a replacement region Rr4, including text T2, in a main image C3 which is processed from the main image C1. A first bar code B1a printed in an image A3 stores a position of the replacement region Rr4, instead of the position of the replacement region Rr1 stored in the first bar code B1 printed in the image A1.

In this case, when the processed image A3 is read as an original image, a further processed main image is obtained while part of the main image C3 is replaced, regardless of the difference in size between the replacement region Rr4 in the main image C3 and a replacement region in the further processed main image.

In this case, as shown in FIG. 9, the controller 5 further includes a region calculating unit 51 that calculates the position of the replacement region Rr4, and a bar code data generating unit 52 that generates data of the first bar code B1a.

Figure 10:
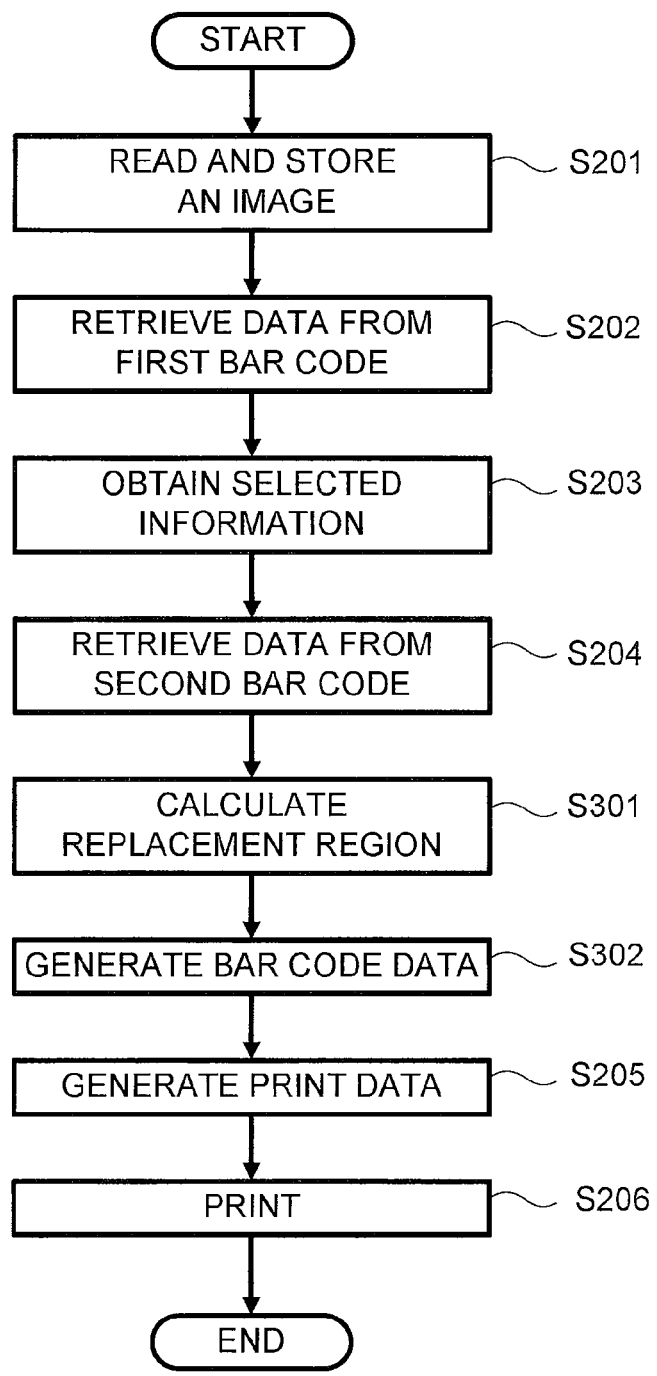
FIG. 10 is a flowchart showing a procedure for printing an image, according to the second modification.

As shown in FIG. 10, after S204 described above, the region calculating unit 51 calculates the position of the replacement region Rr4 based on the position of the replacement region Rr1 retrieved from the first bar code B1 and the text T2 retrieved from the second bar code B2a (S301), and the bar code data generating unit 52 generates data of the first bar code B1a based on the data retrieved from the first bar code B1 and the position of the replacement region Rr4 calculated in S301 described above (S302). In S205 described above, print data of the image A3 is generated from the data retrieved from the second bar code B2a in S204 described above, the data of the image A1 read in S201 described above, and the data of the first bar code B1a generated in S302 described above.

Figure 11A:
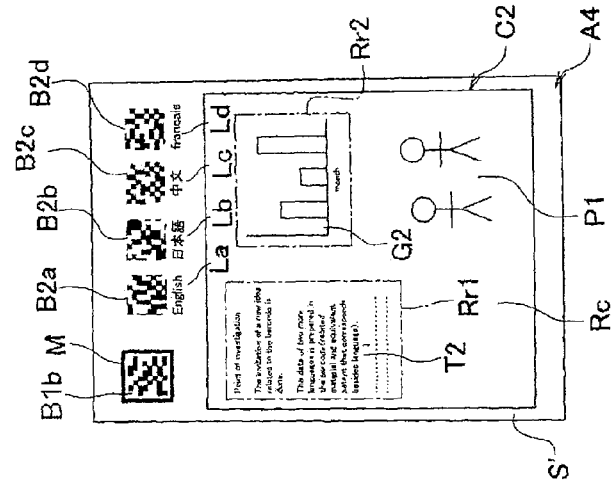
FIG. 11A shows an image printed by the multi-function device, according to a third modification.
Figure 11B:
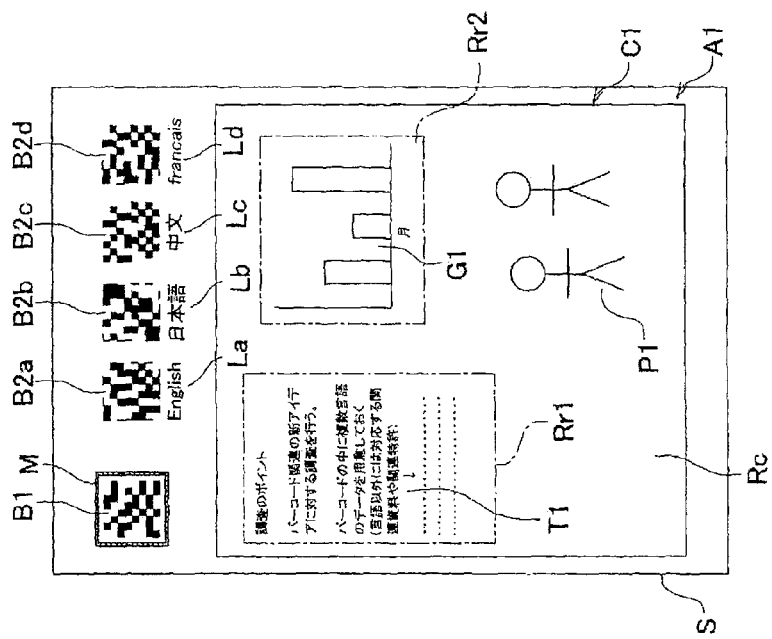
FIG. 11B shows an image printed by the multi-function device based on the image of FIG. 11A, according to the third modification.

In another modification (a third modification), as shown in FIGS. 11A and 11B, the image A1 is processed into an image A4 including the main image C2 while part of the main image C1 is replaced. The image A1 is scaled down into the image A4 at a reduction ratio set by the user operating the operation unit 8. Further, in accordance with the scaling-down of the image A1, the positions of the replacement regions Re1 and Rr2 stored in the first bar code B1a printed in the image A4 are modified from those stored in the first bar code B1 printed in the image A1.

In FIG. 11B, although the first bar code B1a and the second bar codes B2a to B2d in the processed image A4 are also scaled down, the amount of recordable data is not reduced even if they are scaled down, and thus the same amount of data as that of the first bar code B1 and the second bar codes B2a to B2d can be recorded.

Although the first bar code B1a and the second bar codes B2a to B2d in FIG. 11B are printed on a reduced scale, the first bar code B1a and the second bar codes B2a to B2d in the image A4 may be printed in the same sizes as those of the first bar code B1 and the second bar codes B2a to B2d in the image A1, if layout permits, to ensure the accuracy of reading the first bar code B1a and the second bar codes B2a to B2d when the image A4 is read.

In the third modification, when the processed image A4 is read as an original image, a further processed main image is obtained while part of the main image C2 is replaced because the first bar code B1b stores the positions of scaled-down replacement regions.

In this case, in S301 of FIG. 10, described above, the positions of the replacement regions Rr1 and Rr2 in the image A4 are calculated based on the positions of the replacement regions Rr1 and Rr2 stored in the first bar code B1 and the set reduction ratio.

Although the third modification is described when applied to the case in which the image A1 is processed on a reduced scale, the present invention applies also to a case in which the image A1 is processed on an enlarged scale.

Figure 12A:
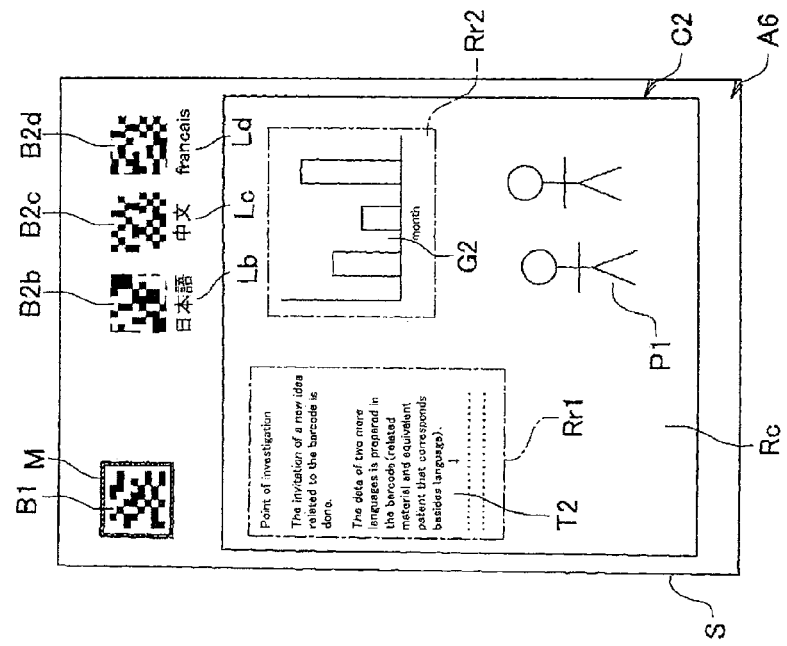
FIG. 12A shows an image printed by the multi-function device, according to a fourth modification.

In the foregoing embodiment, the second bar code B2b storing the same data as that of the text T1 and the graph G1 is disposed in the image A1. Alternatively, as shown in FIG. 12A, an image A5 may be printed such that only the three second bar codes B2a, B2c, and B2d except for the second bar code B2b (a fourth modification) are disposed therein.

Figure 12B:
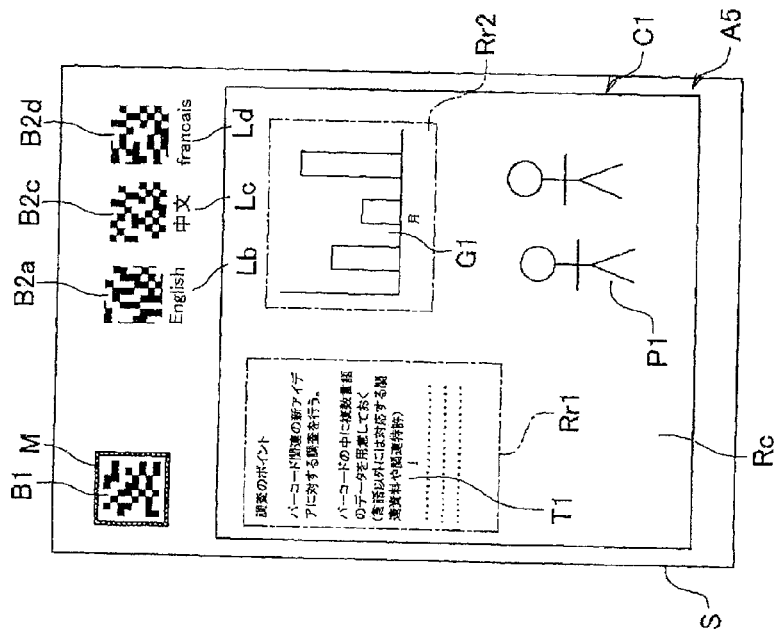
FIG. 12B shows an image printed by the multi-function device based on the image of FIG. 12A, according to the fourth modification.
Figure 13:
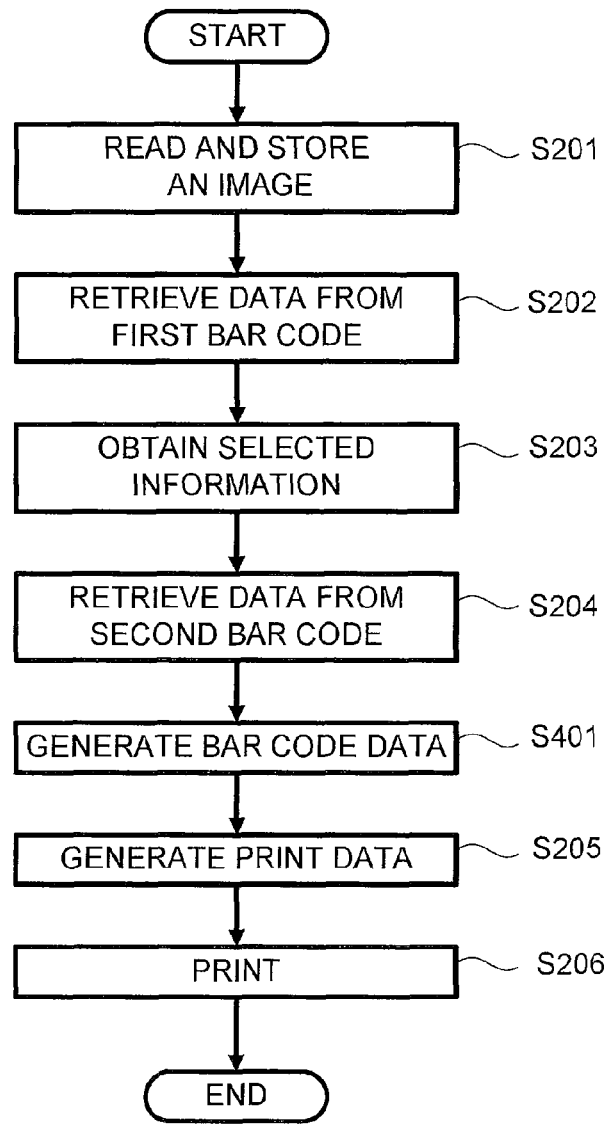
FIG. 13 is a flowchart showing a procedure for printing the image of FIG. 12B, according to the fourth modification.

In this case, as shown in FIG. 13, after S204 described above, data of the second bar code B2b storing the text T1 in the replacement region Rr1 and the graph G1 in the replacement region Rr2 is generated based on the main image C1 read in S201 described above (S401). Thereafter, in S205 described above, print data of an image A6 is generated based on the data retrieved from the second bar code B2a, the data of the read image A5, and the data of the second bar code B2b generated in S401 described above. The image A6 includes the main image C2 in which part of the main image C1 is replaced and the second bar code B2b disposed in place of the second bar code B2a, as shown in FIG. 12B.

Alternatively, the bar code data may not be generated in S401, and print data of an image may be generated in S205 such that neither of the second bar code B2a and B2b is printed in the image A6.

In the foregoing embodiment, although the first bar code B1 and the second bar codes B2a to B2d are printed in the processed image A2, the image A1 including the main image C1, the first bar code B1, and the second bar code B2a to B2b are processed into an image A7 excluding the first bar code B1 and second bar codes B2a to B2d and including only the main image C2, as shown in FIGS. 14A and 14B (a fifth modification).

Further, in the forgoing embodiment, the identifying mark M is printed so as to enclose the first bar code B1, and the scanner 4 recognizes the position of the first bar code B1 by the identifying mark M. The identifying mark M is not necessarily be disposed so as to enclose the first bar code B1 so long as it is disposed in the vicinity of the first bar code B1.

Further, the position of the first bar code B1 may be stored in the ROM or the like of the controller 5 in advance, and when the image A1 is printed, the first bar code B1 may be printed at the specified position stored in the ROM or the like of the controller 5, instead of printing the identifying mark M. In this case, the scanner 4 recognizes the position of the first bar code B1 by retrieving the specified position stored in the ROM or the like of the controller 5.

Further, in the forgoing embodiment, the scanner 4 recognizes the positions of the second bar codes B2a to B2d, based on the positions of the second bar codes B2a to B2d stored in the first bar code B1; however, the invention is not limited thereto.

For example, the multi-function device 1 may be configured such that positions of the second bar codes B2a to B2d are stored in the ROM or the like of the controller 5. When the image A1 is printed, the first bar code B1 that stores information other than the positions of the second bar codes B2a to B2d, such as positions of the replacement regions Rr1 and Rr2, may be printed, and the second bar codes B2a to B2d may be printed at the specified positions stored in the ROM or the like of the controller 5. In this case, the scanner 4 recognizes the positions of the second bar codes B2a to B2d by retrieving the specified positions stored in the ROM or the like of the controller 5.

Further, although, in the forgoing embodiment, the language names La to Ld are printed below the corresponding second bar codes B2a to B2d, the language names La to Ld may be disposed at different positions. In this case, the language names La to Ld may be disposed either in the vicinity of the second bar codes B2a to B2d or at positions away from the second bar codes B2a to B2d.

Also in this case, so long as the first bar code B1 stores the positions of the second bar codes B2a to B2d and the positions of the language names L, the main image C1 is processed into the main image C2 translated into a selected language, as in the forgoing embodiment.

Although, in the forgoing embodiment, a desired language is selected by adding the writing W so as to circle one of the language names La to Ld printed on the sheet S, the present invention is not limited thereto. The language selection may be made by, for example, adding a writing so as to circle one of the second bar codes B2a to B2d with reference to the printed language names La to Ld or by printing checkboxes in the vicinity of the language names L and checking one of those checkboxes.

Further, language selection is not necessarily performed by adding a writing on a printed image. For example, language names, which indicate the contents stored in the second bar codes B2a to B2d, may be displayed on the display 9 of the multi-function device 1 so that the user can select a language by operating the operation unit 8 with reference to the language names on the display 9.

Although, in the foregoing embodiment, the first bar code storing the positions of the replacement regions Rr1 and Rr2, and the second bar codes B2a to B2d storing the replacement images are provided separately, the present invention is not limited thereto.

Figure 15:
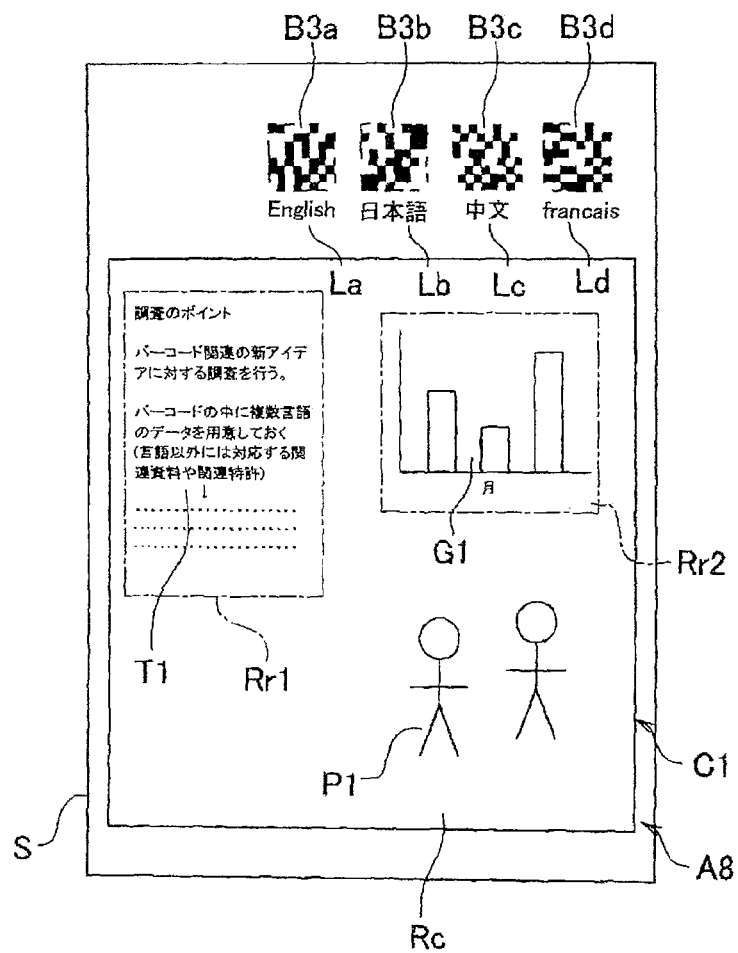
FIG. 15 shows an image printed by the multi-function device, according to a sixth modification.

In another modification (a sixth modification), as shown in FIG. 15, four bar codes B3a to B3d may be disposed in an original image A8 instead of the first bar code B1 and the four second bar codes B2a to B2d disposed in the image A1 (see FIG. 3A). The four bar codes B3a to B3d may store the replacement images, respectively, and each of the four bar codes B3a to B3d may store the positions of the replacement regions Rr1 and Rr2. The positions of the bar codes B3a to B3d and the positions of the language names La to Ld may be stored in the ROM or the like of the multi-function device 1 in advance.

Figure 16:
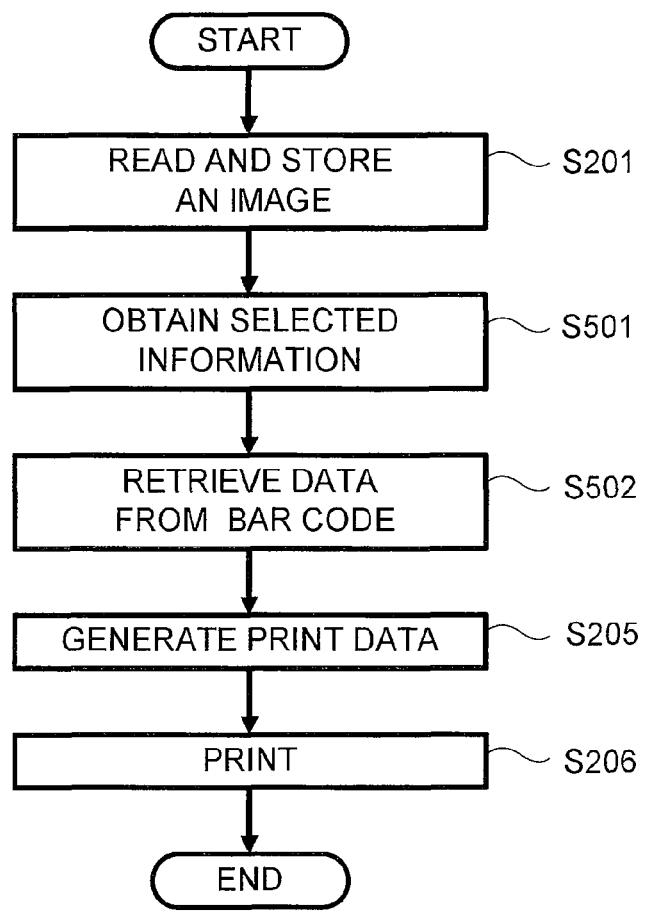
FIG. 16 is a flowchart showing a procedure for processing the image of FIG. 15, according to the sixth modification.

In this case, as shown in FIG. 16, when the image A8 is to be processed, first, the image A8 is read by the scanner 4 in S201 described above, and selected information as to which language (bar code) is selected is obtained from the position of a writing W and the positions of the language names La to Ld stored in the ROM or the like of the controller 5 (S501). Next, data stored in one of the bar codes B3a to B3d corresponding to the selected information is retrieved based on the selected information obtained in S501 and the positions of the bar codes B3a to B3d stored in the ROM or the like of the controller 5 (S502). The subsequent procedure is the same as S205 and S206 described above. However, in the sixth modification, print data is generated in S205 using the data stored in the corresponding one of the bar codes B3a to B3d.

Although, in this embodiment, the four second bar codes B2a to B2d are printed on the sheet S, the present invention is not limited thereto; one to three or five or more second bar codes may be printed depending on the number of kinds of languages.

Further, although, in the forgoing embodiment and modifications, a main image is processed such that text in one language in a replacement region is replaced with text in another language, the present invention is not limited thereto. For example, text in a different font may be stored in a bar code, and a main image may be processed such that text in one font disposed in a replacement region of the main image is replaced with text in another font stored in the bar code.

Further, the replacement is not limited to replacing text (a character string); a drawing or picture having no text may be stored in a bar code, and a main image may be processed such that a drawing or picture in a replacement region of the main image is replaced with another drawing or picture stored in the bar code.

Further, the whole main image, instead of part of a main image, may be replaced. An original main image may be processed such that the whole original main image is replaced with a main image stored in a bar code.

Figure 17A:
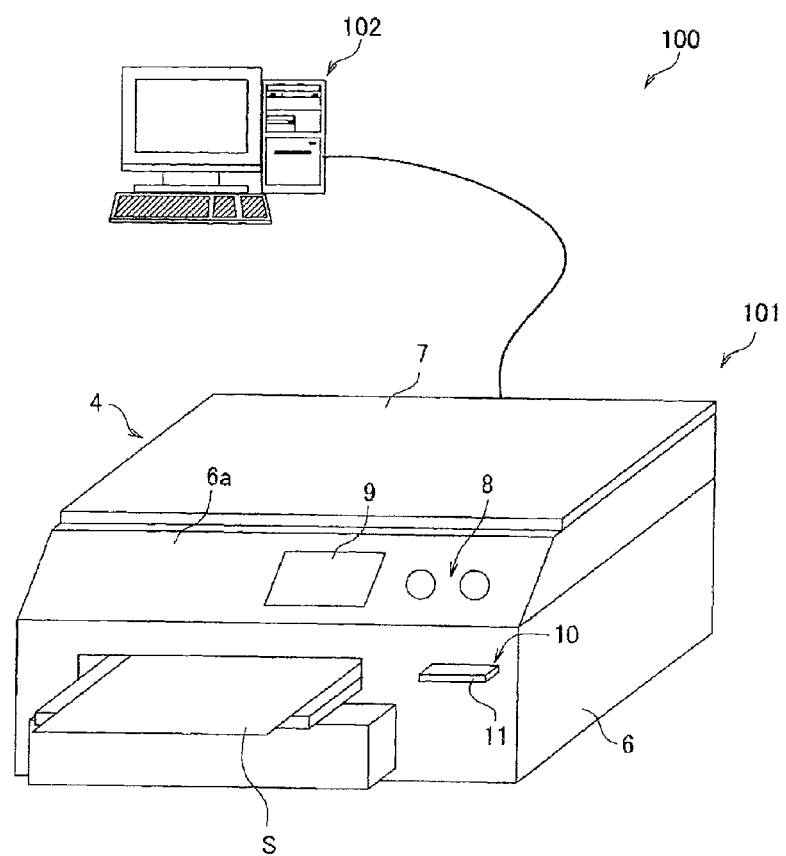
FIG. 17A shows a schematic view showing a printing system comprising a multi-function device and a personal computer (PC), according to a seventh modification.
Figure 17B:
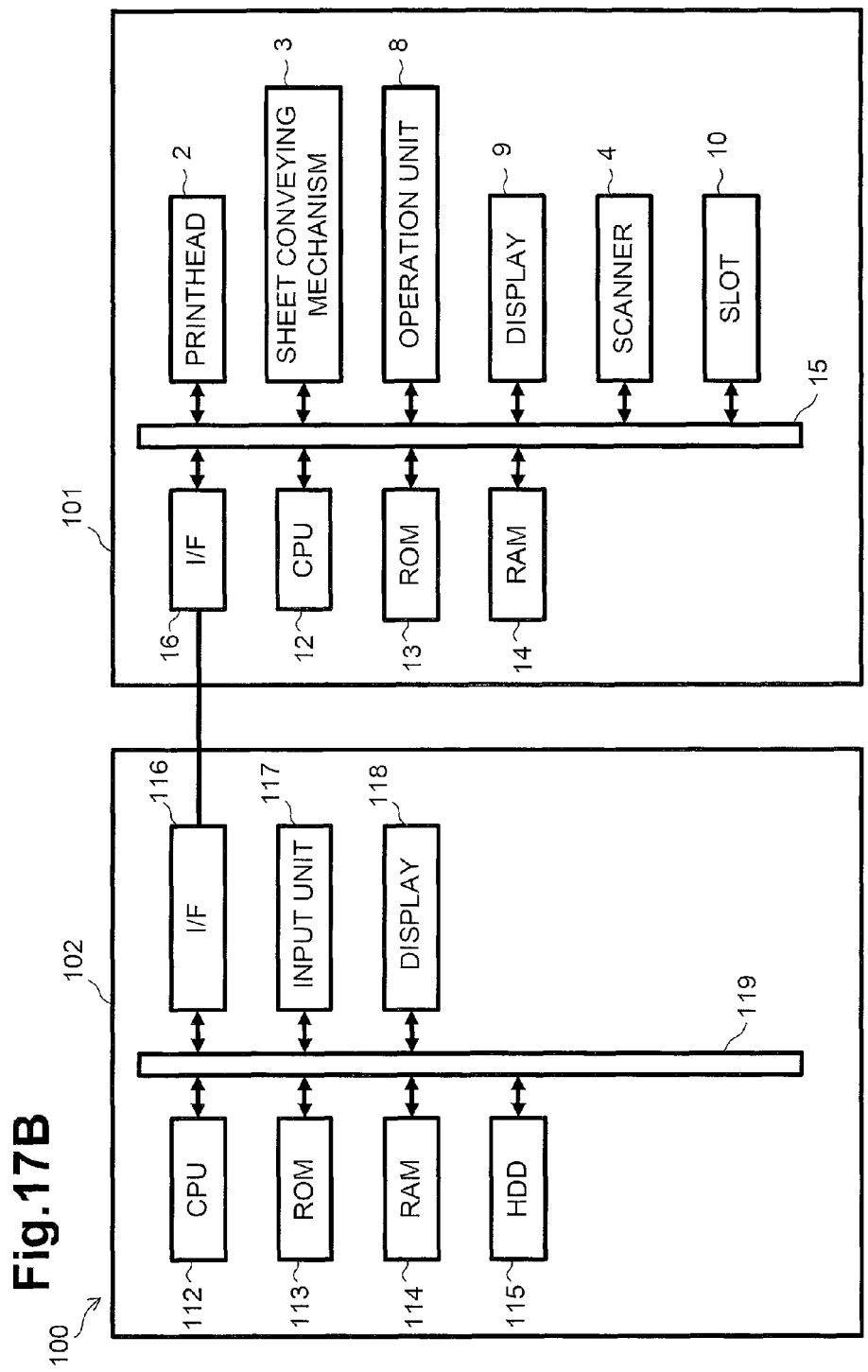
FIG. 17B is a block diagram showing an electrical structure of the printing system of FIG. 17A.
Figure 18:
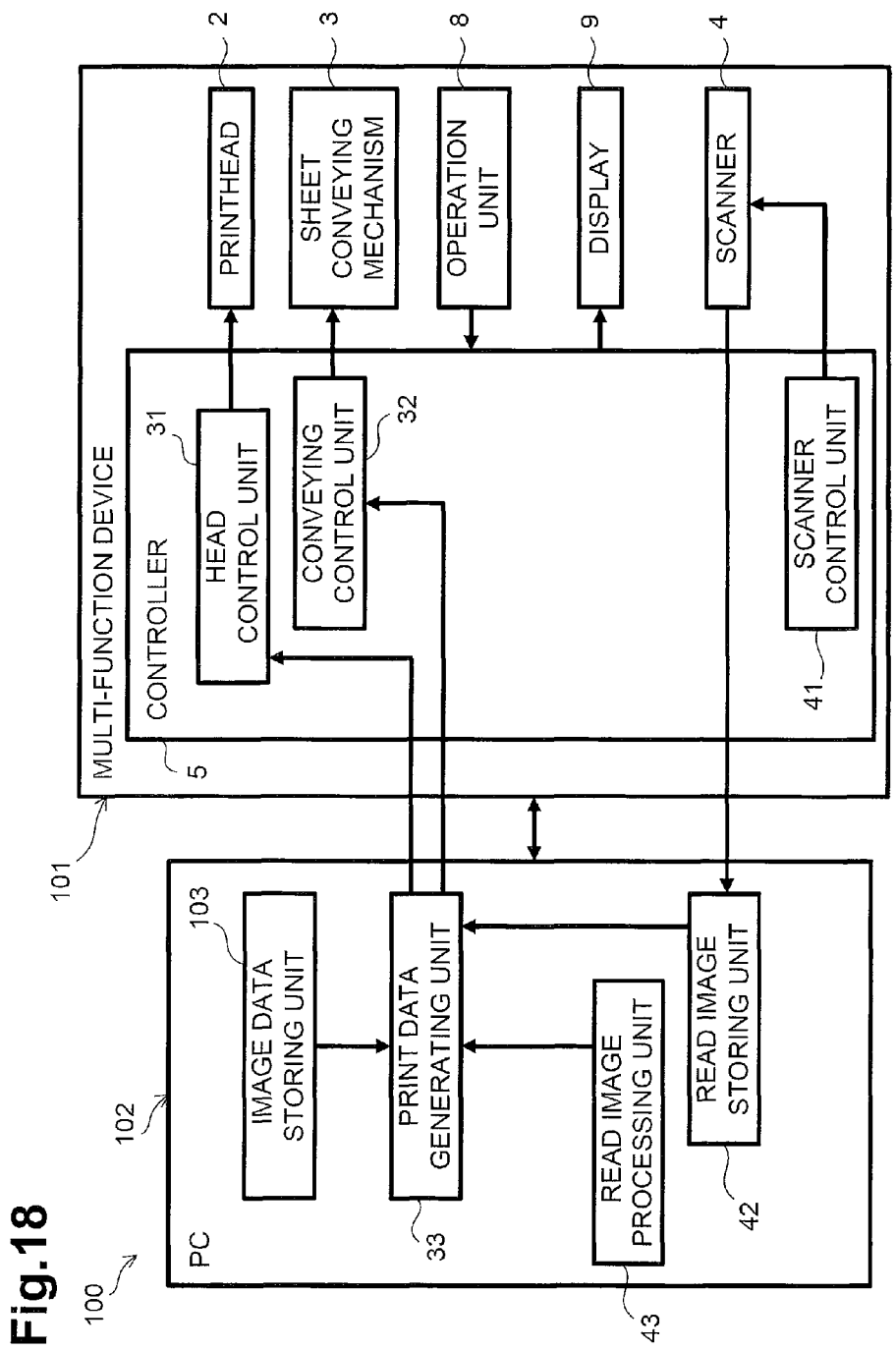
FIG. 18 is a diagram showing control executed by the PC and the controller of the multi-function device.

Although, in the above examples, all the processes are performed in the multi-function device 1, the present invention is not limited thereto. In another modification (a seventh modification), a multi-function device 101 and a personal computer (PC) 102 are connected to configure a print system 100, as shown in FIGS. 17A, 17B and 18. As shown in FIG. 17B, the PC 102 comprises a central processing unit (CPU)

112, a read only memory (ROM) 113, a random access memory (RAM) 114, a hard disc drive (HDD) 115, an interface (I/F) 116, an input device 117, and a display 118, and these elements are electrically connected via a bus 119. The PC 102 and the multi-function device 101 are electrically connected via interfaces (I/F) 16, 116. The HDD 115 is a mass storage device that stores various application programs to be executed by the CPU and various kinds of data including image data.

The CPU 112, ROM 113, RAM 114, and HDD 115 of the PC 102 function as the image data storing unit 103, print data generating unit 33, read image processing unit 43, and read image storing unit 42. The CPU 12, ROM 13, and RAM 14 of the multi-function device 101 function as the head control unit 31, conveying control unit 32, and scanner control unit 41.

In the seventh modification, the PC 102 comprises a print data generating unit 33, a read image storing unit 42, a read image processing unit 43, and an image data storing unit 103 that is configured by the above-described mass storage device and stores image data of an original image to be read by the scanner 4. The print data generating unit 33 generates print data based on image data stored in the image data storing unit 103, an image stored in the read image storing unit 42, and the processing result of the read image processing unit 43. On the other hand, the multi-function device 101 has a configuration in which the print data generating unit 33, the read image storing unit 42, and the read image processing unit 43 are excluded from the multi-function device 1 (see FIGS. 1 and 2).

Figure 19:
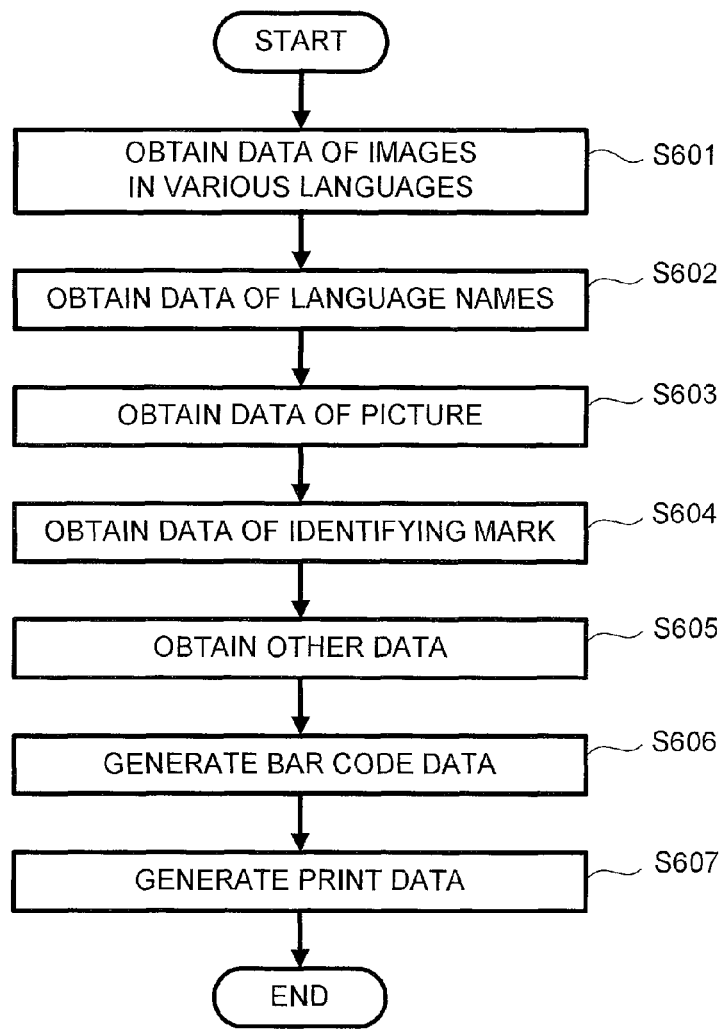
FIG. 19 is a flowchart showing a procedure for generating print data of the image of FIG. 3A.

The print data generating unit 33 of the PC 102 may generate print data of the image A1 (FIG. 3A) by carrying out the procedure shown in FIG. 19. The print data generating unit 33 may obtain data of images (text T1 and graph G1) in Japanese and data of corresponding images in English, Chinese, and French in S601, data of the language names La to Ld in S602, data of the picture P1 in S603, data of the identifying mark M in S604, and other data necessary for generating data of the first bar code B1, data of the second bar codes B2a to B2d in S605, and print data of the image A1. Then, the print data generating unit 33 may generate print data of the image A1 in S607. Alternatively, the print data generating unit 33 of the controller 5 of the multi-function device 1 (FIG. 2) may generate print data of the image A1 in a similar manner. Or, these steps S601-S606 may be carried out by a print image generating device other than the PC 102 and the multi-function device 1.

Further, a non-transitory recording medium storing a computer-readable program may be installed in a computer so that the program is executed by a processer of the computer to cause the processor to generate print data of image A1 (FIG. 3A).

The seventh modification offers substantially the same operational advantages as those of the foregoing embodiment, although part of the processes is performed by the PC 102 in the seventh modification. As in the foregoing embodiment, an original image is printed such that, when the original image is read by a scanner, the original image is processed into an image in which part of the original image is replaced.

Although, in the seventh modification, the PC 102 comprises the print data generating unit 33, the read image storing unit 42, and the read image processing unit 43, the multi-function device 101 may comprise one or some of these units.

In the forgoing embodiment and modifications, the image A1 and image A2 are printed by the same device, e.g., the multi-function device 1 or the multifunction device 101 of the printing system 100. Nevertheless, the image A1 may be printed by a different device from the device that prints the image A2.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. A printing system comprising:
a print data generating unit configured to generate first print data of an original image that includes a first sub-image at a disposing position, wherein the first sub-image comprises at least one of a first graphic and a first character string, and a bar code that stores the disposing position and a second sub-image, wherein the second sub-image comprises at least one of a second graphic and a second character string different from the at least one of the first graphic and the first character string;
a first printing unit configured to print the original image on a first recording medium based on the first print data;
a second printing unit;
a reading unit; and
a controller configured to:
control the reading unit to read the original image printed on the first recording medium and to retrieve the disposing position and the second sub-image from the bar code,
generate second print data of a processed image in which the retrieved second sub-image is disposed at the retrieved disposing position, and
control the second printing unit to print the processed image on a second recording medium different from the first recording medium based on the second print data.

2. The printing system according to claim 1, wherein the controller is configured to generate the second print data of the processed image by replacing the first sub-image of the read original image with the second sub-image.

3. The printing system according to claim 2, wherein the processed image includes a portion of the read original image.

4. The printing system according to claim 1, wherein the bar code of the original image comprises a first bar code storing at least the disposing position, and at least one second bar code storing at least the second sub-image.

5. The printing system according to claim 4, wherein the original image further includes an identifying image for distinguishing the first bar code from the at least one second bar code.

6. The printing system according to claim 4, wherein the at least one second bar code comprises a plurality of second bar codes, wherein each of the plurality of second bar codes stores a different second sub-image.

7. The printing system according to claim 6, wherein the original image further comprises a plurality of content indicating images, wherein each of the plurality of content indicating images indicates contents of a corresponding one of the plurality of second bar codes.

8. The printing system according to claim 7, wherein the first bar code further stores positions of the plurality of content indicating images.

9. A multi-function device comprising:
a printing unit;
a reading unit; and
a controller configured to:
- control the reading unit to read an original image printed on a first recording medium that includes a first sub-image at a disposing position, wherein the first sub-image comprises at least one of a first graphic and a first character string, and a bar code that stores the disposing position and a second sub-image, wherein the second sub-image comprises at least one of a second graphic and a second character string different from the at least one of the first graphic and the first character string, and to retrieve the disposing position and the second sub-image from the bar code,
- generate print data of a processed image in which the retrieved second sub-image is disposed at the retrieved disposing position, and
- control the printing unit to print the processed image on a second recording medium different from the first recording medium based on the print data.

10. The multi-function device according to claim 9, wherein the controller is configured to generate the print data of the processed image in which the second sub-image is disposed at the disposing position by replacing the first sub-image of the read original image.

11. The multi-function device according to claim 9, wherein the processed image includes the second sub-image in place of the first sub-image.

12. The multi-function device according to claim 11, wherein the processed image includes a bar code.

13. The multi-function device according to claim 12, wherein the bar code of the processed image stores the first sub-image of the original image.

14. The multi-function device according to claim 11, wherein the first sub-image includes a character string in a first language, and the second sub-image includes a character string in a second language different from the first language.

15. The multi-function device according to claim 11, wherein the second sub-image, when printed on the second recording medium, is different in size from the first sub-image printed on the first recording medium.

16. The multi-function device according to claim 9, wherein the processed image, when printed on the second recording medium, is different in size from the original image printed on the first recording medium.

* * * * *